J. H. Littlefield.
Press and Strainer.
Nº 78,981. Patented Jun. 16, 1868.
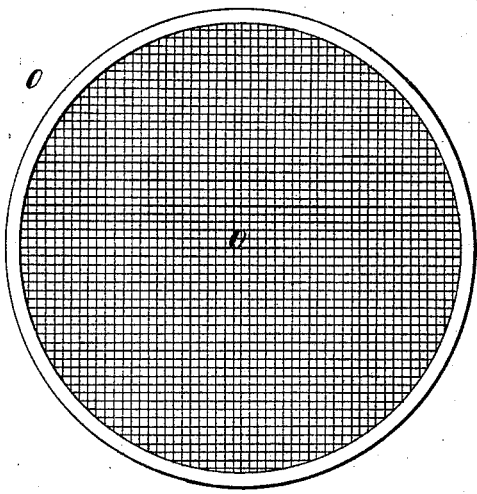
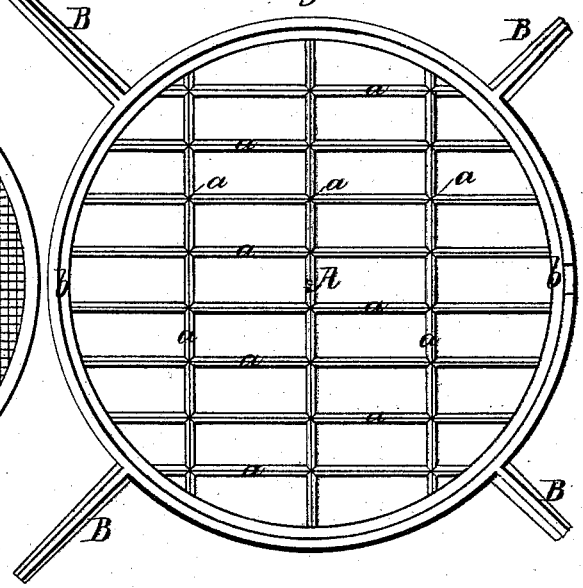
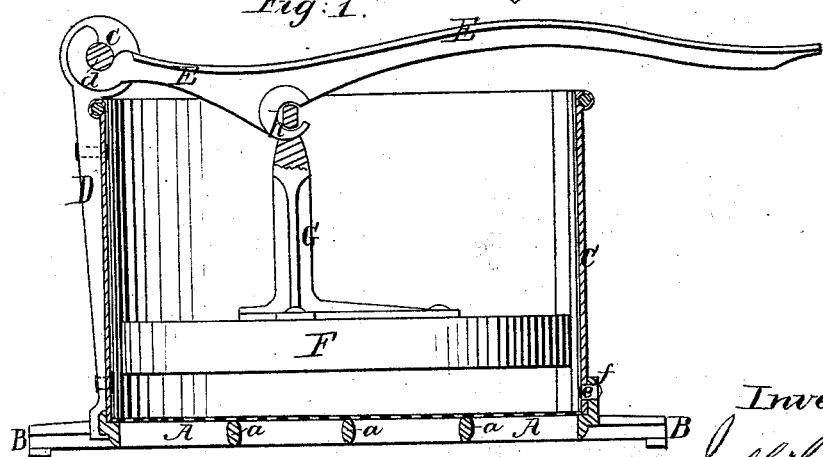

United States Patent Office.

JOSEPH H. LITTLEFIELD, OF CAMBRIDGE, MASSACHUSETTS.

Letters Patent No. 78,981, dated June 16, 1868.

IMPROVED COMBINED PRESS AND STRAINER.

The Schedule referred to in these Letters Patent and making part of the same.

TO ALL WHOM IT MAY CONCERN:

Be it known that I, JOSEPH H. LITTLEFIELD, of Cambridge, in the county of Middlesex, and in the State of Massachusetts, have invented certain new and useful Improvements in Combined Press and Strainer; and do hereby declare that the following is a full, clear, and exact description thereof, reference being had to the accompanying drawings, and to the letters of reference marked thereon.

In the annexed drawings, forming part of this specification—

Figure 1 represents a side sectional view of my machine,

Figure 2 a plan view of sieve or strainer, and

Figure 3 a plan view of stand or frame.

The nature of my invention consists in providing a stand, with can or vessel, sieve and follower, worked by means of a lever, for the purpose of pressing, sifting, and straining lard, tallow, pumpkins, apples, jellies, currants, wine, &c., &c.

To enable others skilled in the art to make and use my invention, I will proceed to describe its construction and operation.

I construct a stand or frame, A, of wood, metal, or other suitable material, embracing the arms B B, to span a pot, pan, or other suitable vessel, and grating-work of cross-bars $a$ $a$, which cross-bars, in forming the grating, must be sufficiently near together to thoroughly support the strainer.

The circular rim of the frame A has a flange, $b$, into which the tin dish or case C sits. The dish or case C is made of tin, zinc, wood, or other suitable material, in circular form, on one side of which I rivet a cast or malleable-iron stay, D, hooking down under the frame A, and running enough above top of the case C to allow the lever E to hook into the side ears $c$ and pintle $d$, on the top of the iron stay D. This fastens one side of the case C to the bottom grating A, while the opposite side is held down by means of soldering a small wire, $e$, on to the outside of the case, and letting it go through an ear, $f$, on the rim of frame A, and heading it thereunder, or by applying a small nut thereto.

The strainer O is made of wire cloth, or perforated tin, copper, zinc, or other suitable material, and portable, to be taken out and put in as desired, and laid inside of the case C on the grating A. There may be several grades of strainers to each case, such as fine, medium, and coarse, or of any grade desired, to suit any material which is to be strained or sifted. These portable strainers are made a good finish of themselves by being bound round the edge with narrow tin, copper, or zinc, or a small wire, neatly rolled in, or in any manner that may be desired.

Fig. 2 of the annexed drawings represents the strainer, made as above described, forming a bottom to the dish or case C. But it may also be made in the shape of a dish or case, with perforated sides and bottom placed in the outside case C, leaving a space between the two, thus allowing the material required to be strained to pass through the sides and drop down between the dishes, and through the grating, as well as through the bottom; the inner case or strainer being provided with guards on the outer side to keep it central within the outer case.

The follower F, which serves to press the material through the strainer, I make of wood or metal, or both combined, either separate from and connected to or cast solid with the post G, in the top of which is a square long hole, which hooks on to the hook $h$, formed or cast on the lever E, allowing the follower F to adjust itself to the dish or case, when the lever is raised or lowered, and can be easily unhooked from the lever when thrown back on a line therewith.

The lever E is made of cast iron, wood, or any other suitable material, and in such a shape as to make it sufficiently strong for the purposes required, and to be unhooked from the stationary post D, riveted on the dish C, if desired, by throwing it over back.

I am aware that the devices herein described, taken separately, are of themselves not new, but having thus fully described my invention,

What I claim as new, and desire to secure by Letters Patent, is—

The metal frame A, with grates $a\ a$ and feet B B, in combination with the strainer O and bottomless case C, with standard D, lever E, bar G, and follower F, the several parts, being constructed, arranged, and used substantially in the manner specified.

In testimony that I claim the foregoing, I have hereunto set my hand and seal, this 17th day of April, 1868.

JOSEPH H. LITTLEFIELD. [L. S.]

Witnesses:
 SETH J. THOMAS,
 J. W. DERBY.